(12) United States Patent
Jia et al.

(10) Patent No.: US 10,923,999 B2
(45) Date of Patent: Feb. 16, 2021

(54) ACTIVE POWER FILTER-BASED MODULAR MULTILEVEL CONVERTER

(71) Applicant: Zhejiang University, Zhejiang (CN)

(72) Inventors: Guanlong Jia, Zhejiang (CN); Min Chen, Zhejiang (CN); Song Tang, Zhejiang (CN)

(73) Assignee: Zhejiang University, Hangzhou (CN)

( * ) Notice: Subject to any disclaimer, the term of this patent is extended or adjusted under 35 U.S.C. 154(b) by 0 days.

(21) Appl. No.: 16/830,233

(22) Filed: Mar. 25, 2020

(65) Prior Publication Data
US 2020/0313540 A1 Oct. 1, 2020

(30) Foreign Application Priority Data
Mar. 29, 2019 (CN) .......................... 201910247520.5

(51) Int. Cl.
| | | |
|---|---|---|
| *H02M 1/12* | (2006.01) | |
| *H02J 3/01* | (2006.01) | |
| *H02J 3/18* | (2006.01) | |
| *H02M 7/483* | (2007.01) | |
| *H02M 7/5387* | (2007.01) | |

(52) U.S. Cl.
CPC ................. *H02M 1/12* (2013.01); *H02J 3/01* (2013.01); *H02J 3/1842* (2013.01); *H02M 7/483* (2013.01); *H02M 7/53871* (2013.01)

(58) Field of Classification Search
CPC .......... H02M 1/126; H02M 1/12; H02M 7/42; H02M 7/48; H02M 7/483; H02M 7/44; H02M 7/4807; H02M 7/53871; H02M 2001/123; H02J 3/01; H02J 3/1842
See application file for complete search history.

(56) References Cited

U.S. PATENT DOCUMENTS

| | | | | |
|---|---|---|---|---|
| 9,246,407 | B2* | 1/2016 | Schroeder | ............. H02M 7/483 |
| 9,401,633 | B2* | 7/2016 | Tang | ....................... H02M 7/48 |
| 9,467,063 | B2* | 10/2016 | Krein | ....................... H02M 7/42 |
| 10,680,505 | B2* | 6/2020 | Yoscovich | ............. H02M 1/08 |
| 2003/0123268 | A1* | 7/2003 | Pai | .................... H02M 7/53871 |
| | | | | 363/131 |
| 2003/0169109 | A1* | 9/2003 | Chou | ....................... H02J 3/01 |
| | | | | 330/149 |

(Continued)

FOREIGN PATENT DOCUMENTS

| | | |
|---|---|---|
| CN | 108448919 A | 8/2018 |
| CN | 108667284 A | 10/2018 |

*Primary Examiner* — Adolf F Berhane

(57) ABSTRACT

Provided is an active power filter-based modular multilevel converter, relating to the field of power electronics. According to the converter, an active power filter circuit is provided between upper and lower arms of each phase in a modular multilevel converter. The active power filter circuit includes two switch power devices, two submodules, a capacitor, and an inductor. The upper and lower bridge-arms are connected in series by means of two submodules, the two switch power devices are connected in series and then connected in parallel to ends of intermediate submodules which are connected in series, and the capacitor and the inductor are connected in series and then connected in parallel to two ends of the switch power device connected to the lower bridge-arm. The defect of large capacitance of submodule in conventional modular multilevel topology is overcome.

6 Claims, 4 Drawing Sheets

(56) References Cited

U.S. PATENT DOCUMENTS

| | | | | |
|---|---|---|---|---|
| 2005/0207197 A1* | 9/2005 | Chou | ............... | H02M 1/12 |
| | | | | 363/131 |
| 2006/0033479 A1* | 2/2006 | Chou | ............... | H02J 3/01 |
| | | | | 323/207 |
| 2006/0062034 A1* | 3/2006 | Mazumder | ............... | H02M 7/4807 |
| | | | | 363/131 |
| 2012/0300514 A1* | 11/2012 | Kolar | ............... | H02J 3/1857 |
| | | | | 363/41 |
| 2013/0229836 A1* | 9/2013 | Wang | ............... | H02M 1/12 |
| | | | | 363/40 |
| 2013/0229837 A1* | 9/2013 | Wang | ............... | H02J 3/1842 |
| | | | | 363/40 |
| 2013/0229838 A1* | 9/2013 | Wang | ............... | H02M 7/493 |
| | | | | 363/40 |
| 2014/0140112 A1* | 5/2014 | Zhou | ............... | H02M 1/12 |
| | | | | 363/40 |
| 2016/0336751 A1* | 11/2016 | Hu | ............... | H02M 5/4585 |
| 2017/0047727 A1* | 2/2017 | Cao | ............... | H05K 7/20927 |
| 2018/0226900 A1* | 8/2018 | Xie | ............... | H02M 7/00 |

* cited by examiner

ACTIVE POWER FILTER-BASED MODULAR MULTILEVEL CONVERTER

CROSS REFERENCE TO RELATED APPLICATIONS

The present application claims the benefit of Chinese Patent Application No. 201910247520.5 filed on Mar. 29, 2019, the contents of which are incorporated herein by reference in their entirety.

FIELD OF THE INVENTION

The present disclosure belongs to the field of power electronics, and relates to a novel modular multilevel converter topology.

BACKGROUND OF THE INVENTION

Due to the uneven distribution of natural resources, as well as the imbalance between the levels of development of various regions and between the levels of demand for electrical energy, countries have a great demand for long-distance transmission of electrical energy. In order to improve the efficiency of long-distance transmission of electrical energy, the most commonly used method at present is to increase classes of voltage for transmission, such as high voltage direct current transmission, voltage source converter based high voltage direct current transmission, and ultra-high voltage power transmission.

With the development of modern power electronics technology, power electronics devices have been widely used in the field of medium and high-voltage power transmission. At present, the commonly used power electronics devices mainly include multilevel converters, such as two-level voltage source converters, three-level converters, and cascades. However, with the rise of voltage class, two-level conversion has been unable to meet corresponding technical requirements. Multilevel converters have been paid more and more attention in high-voltage and high-power applications because of their many advantages, and in particular, modular multilevel topology is the direction of future development.

Modular multilevel converter (MMC) topology was first proposed by foreign scholars. MMC topology has the advantages of high modularity, easy expansion, less output harmonics, and no need for filter circuits, and has been applied worldwide at present. However, it can be observed from actual engineering that the volume of capacitors of submodules accounts for more than half of the volume of an entire converter. Because of this significant defect, the popularization and application of MMC topology is greatly limited. Since the magnitude of the capacitance of a submodule is related to the fluctuation of capacitor voltage, in patents CN108667284A entitled "Modular multilevel converter circulating current suppression method" and CN108448919A entitled "Modular multilevel converter circulating current inhibition method based on virtual reactance", the fluctuation of the capacitor voltage of a submodule is reduced by suppressing circulating current or the like, thereby reducing the capacitance of the submodule. In addition, there are methods such as harmonic injection. The above methods are methods for control, and the actual effects thereof are limited, specifically due to complicated control manners, increased system losses and the like. To this end, a method with better effects is proposed, which is of great significance to the promotion and application of MMC topology.

SUMMARY OF THE INVENTION

The technical problem to be solved by the present disclosure is to overcome the defects in the existing technology, and provides an active power filter-based modular multilevel converter.

To solve the technical problem, the solution of the present invention provides an active power filter-based modular multilevel converter (APF-MMC), which includes six bridge-arms of three phases, wherein each phase includes an upper bridge-arm and a lower bridge-arm, each bridge-arm includes a bridge-arm inductor and at least one submodule of a same structure which are connected in series, each submodule is composed of two switch power devices and a capacitor. An active power filter circuit is provided between the upper and lower bridge-arms of each phase, said circuit including two switch power devices, two submodules, a capacitor, and an inductor. The upper and lower bridge-arms are connected in series by means of two submodules, which are called intermediate submodules; the two switch power devices of the active power filter circuit are connected in series and then connected in parallel to ends of the intermediate submodules which are connected in series; and the capacitor and the inductor are connected in series and then connected in parallel to two ends of the switch power device connected to the lower bridge-arm.

In the present disclosure, the switch power devices in the submodule have backward diodes.

In the present disclosure, the bridge-arm inductor is located at an end of each phase, i.e., one end of the bridge-arm inductor is directly connected to a bus bar, and the other end of the bridge-arm inductor is connected to a submodule; or the bridge-arm inductor is located in the bridge-arm other than between the intermediate submodules.

In the present disclosure, each submodule has three external terminals, an upper terminal of which is extracted from a collector electrode of a first power switch device, an intermediate terminal of which is extracted from a joint between an emitter of the first power switch device and a collector electrode of the second power switch device, and a lower terminal of which is extracted from an emitter of the second power switch device; and the capacitor in the submodule is connected in parallel between the upper terminal and the lower terminal.

Compared with the existing technology, beneficial effects of the present disclosure are as follows:

1. The present disclosure overcomes the defect of large capacitance of submodule in conventional modular multilevel topology. By adding an additional active power filter (APF) without changing an existing topology, a capacitor with a less capacitance can be used in each submodule in a converter, thereby reducing the hardware cost and size of an MMC topology.

2. Compared with the circulating current suppression method or the harmonic injection method, the present disclosure has the advantages of simple implementation and less system loss.

DETAILED DESCRIPTION OF THE EMBODIMENTS

The embodiments of the present disclosure will be described in detail below with reference to the drawings.

Figure 2:
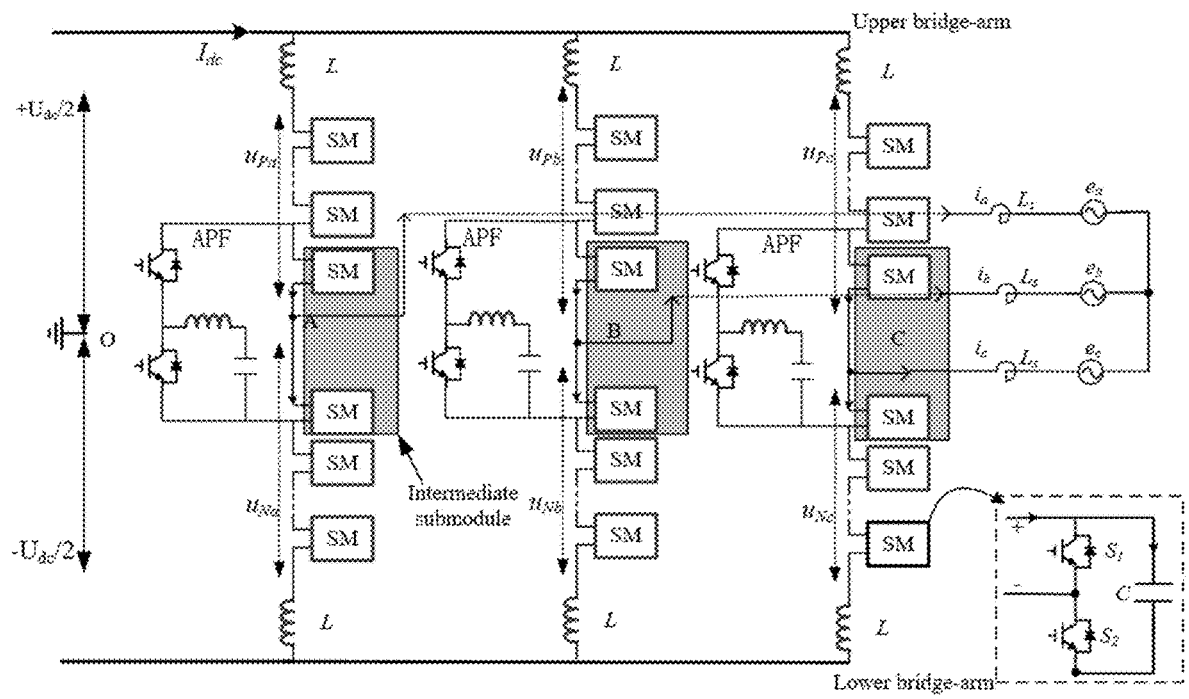
FIG. 2 is an active power filter (APF)-based modular multilevel (APF-MMC) topology.

As shown in FIG. 2, an active power filter-based modular multilevel converter in the present disclosure includes six bridge-arms of three phases, each phase including an upper bridge-arm and a lower bridge-arm, each bridge-arm including a bridge-arm inductor L and at least one submodule SM of a same structure which are connected in series. The bridge-arm inductor L is located at an end of each phase, i.e., one end of the bridge-arm inductor L is directly connected to a bus bar, and the other end of the bridge-arm inductor L is connected to a submodule SM (the bridge-arm inductor L may also be located in the bridge-arm other than between intermediate submodules). Each submodule SM is composed of two switch power devices $S_1$ and $S_2$ with backward diodes, and a capacitor C.

Different from the modular multilevel converter in the existing technology, the present disclosure innovatively provides an active power filter (APF) circuit between the upper and lower bridge-arms of each phase. The APF circuit includes two switch power devices, two submodules SM, a capacitor, and an inductor. The upper and lower bridge-arms are connected in series by means of two submodules SM, which are called intermediate submodules. The two switch power devices of the APF circuit are connected in series and then connected in parallel to ends of the intermediate submodules connected in series in the APF circuit. The capacitor and inductor of the APF circuit are connected in series and then connected in parallel to two ends of the switch power device connected to the lower bridge-arm. Each submodule SM has three external terminals, an upper terminal of which is extracted from a collector electrode of a first power switch device $S_1$, an intermediate terminal of which is extracted from a joint between an emitter of the first power switch device $S_1$ and a collector electrode of the second power switch device $S_2$, and a lower terminal of which is extracted from an emitter of the second power switch device $S_2$; and the capacitor C in the submodule is connected in parallel between the upper terminal and the lower terminal.

The specific implementation principle and verification of technical effects of the present disclosure will be described below.

Figure 1:
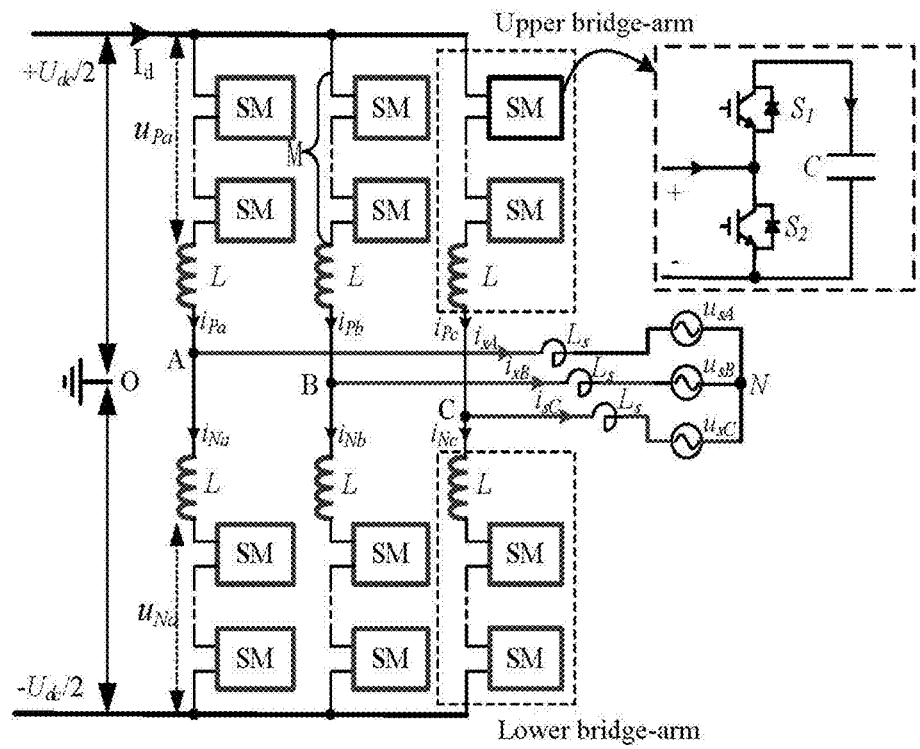
FIG. 1 shows a conventional MMC topology.

FIG. 1 is a schematic diagram of a conventional modular multilevel topology. It can be seen from the existing literatures that, taking phase A as an example, voltages and currents of upper and lower bridge-arms in FIG. 1 have the following relationships:

$$\begin{cases} u_{Px} = \frac{1}{2}U_{dc}[1 - k\sin(\omega t + \theta_x)] + \frac{U_{2f}}{2}\sin(2\omega t + \theta_x - \varphi) \\ u_{Nx} = \frac{1}{2}U_{dc}[1 + k\sin(\omega t + \theta_x)] + \frac{U_{2f}}{2}\sin(2\omega t + \theta_x - \varphi) \end{cases}, \text{and} \quad (1)$$

$$\begin{cases} i_{Px} = \frac{1}{3}I_{dc}[1 + m\sin(\omega t + \theta_x - \varphi)] + I_{2f}\cos(2\omega t + \theta_x - \varphi) \\ i_{Nx} = \frac{1}{3}I_{dc}[1 - m\sin(\omega t + \theta_x - \varphi)] + I_{2f}\cos(2\omega t + \theta_x - \varphi) \end{cases}, \quad (2)$$

wherein $$k = \frac{E_{xm}}{U_{dc}/2}, m = \frac{I_{xm}/2}{I_{dc}/3},$$

km cos φ=2, $u_{px}$ and $u_{nx}$ are voltages of the upper and lower bridge-arms, respectively, $U_{dc}$ and $I_{dc}$ are DC-side voltage and current, respectively, $i_{px}$ and $i_{nx}$ are currents of the upper and lower bridge-arms, respectively, $U_{2f}$ and $I_{2f}$ are amplitudes of frequency-doubled voltage and of frequency-doubled current, respectively, $E_{xm}$ and $I_{xm}$ are amplitudes of AC-side voltage and current, respectively, ω is an angular velocity of a power grid, and φ is a power factor angle.

Instantaneous powers of the upper and lower bridge-arms are:

$$\begin{cases} p_{Px} = u_{Px}i_{Px} = \frac{mU_{dc}I_{dc}}{6}\sin(\omega t + \theta_x - \varphi) - \frac{kU_{dc}I_{dc}}{6}\sin(\omega t + \theta_x) + \\ \frac{mU_{2f}I_{dc}}{12}\cos\omega t + \frac{kU_{dc}I_{2f}}{4}\sin(\omega t - \varphi) + \frac{U_{dc}I_{2f}}{2}\cos(2\omega t + \theta_x - \varphi) + \\ \frac{mkU_{dc}I_{dc}}{12}\cos(2\omega t + 2\theta_x - \varphi) + \frac{U_{2f}I_{dc}}{6}\sin(2\omega t + \theta_x - \varphi) - \\ \frac{kU_{dc}I_{2f}}{4}\sin(3\omega t + 2\theta_x - \varphi) - \frac{mU_{2f}I_{dc}}{12}\cos(3\omega t + 2\theta_x - 2\varphi) + \\ \frac{U_{2f}I_{2f}}{4}\sin(4\omega t + 2\theta_x - 2\varphi) \\ p_{Nx} = u_{Nx}i_{Nx} = -\frac{mU_{dc}I_{dc}}{6}\sin(\omega t + \theta_x - \varphi) + \frac{kU_{dc}I_{dc}}{6}\sin(\omega t + \theta_x) - \\ \frac{mU_{2f}I_{dc}}{12}\cos\omega t - \frac{kU_{dc}I_{2f}}{4}\sin(\omega t - \varphi) + \frac{U_{dc}I_{2f}}{2}\cos(2\omega t + \theta_x - \varphi) + \\ \frac{mkU_{dc}I_{dc}}{12}\cos(2\omega t + 2\theta_x - \varphi) + \frac{U_{2f}I_{dc}}{6}\sin(2\omega t + \theta_x - \varphi) + \\ \frac{kU_{dc}I_{2f}}{4}\sin(3\omega t + 2\theta_x - \varphi) + \frac{mU_{2f}I_{dc}}{12}\cos(3\omega t + 2\theta_x - 2\varphi) + \\ \frac{U_{2f}I_{2f}}{4}\sin(4\omega t + 2\theta_x - 2\varphi) \end{cases}, \quad (3)$$

respectively.

Powers of the upper and lower bridge-arms are summed to obtain a phase power of each phase as:

$$p_{xphase} = p_{Px} + p_{Nx} = \quad (4)$$

$$U_{dc}I_{2f}\cos(2\omega t + \theta_x - \varphi) + \frac{mkU_{dc}I_{dc}}{6}\cos(2\omega t + 2\theta_x - \varphi) +$$

$$\frac{U_{2f}I_{dc}}{3}\sin(2\omega t + \theta_x - \varphi) + \frac{U_{2f}I_{2f}}{2}\sin(4\omega t + 2\theta_x - \varphi).$$

Assuming that a power of a signal at an even multiple of frequency in each phase is fully absorbed by the APF circuit, in this case, the instantaneous powers of the upper and lower bridge-arms of each phase are:

$$\begin{cases} p_{Px} = \dfrac{mU_{dc}I_{dc}}{6}\sin(\omega t + \theta_x - \varphi) - \dfrac{kU_{dc}I_{dc}}{6}\sin(\omega t + \theta_x) + \\ \qquad \dfrac{mU_{2f}I_{dc}}{12}\cos\omega t + \dfrac{kU_{dc}I_{2f}}{4}\sin(\omega t - \varphi) - \dfrac{kU_{dc}I_{2f}}{4} \\ \qquad \sin(3\omega t + 2\theta_x - \varphi) - \dfrac{mU_{2f}I_{dc}}{12}\cos(3\omega t + 2\theta_x - 2\varphi) \\ p_{Nx} = -\dfrac{mU_{dc}I_{dc}}{6}\sin(\omega t + \theta_x - \varphi) + \dfrac{kU_{dc}I_{dc}}{6}\sin(\omega t + \theta_x) - \\ \qquad \dfrac{mU_{2f}I_{dc}}{12}\cos\omega t - \dfrac{kU_{dc}I_{2f}}{4}\sin(\omega t - \varphi) + \dfrac{kU_{dc}I_{2f}}{4} \\ \qquad \sin(3\omega t + 2\theta_x - \varphi) + \dfrac{mU_{2f}I_{dc}}{12}\cos(3\omega t + 2\theta_x - 2\varphi) \end{cases} \quad (5)$$

respectively.

From known literatures and books, the formula for calculating a capacitance of a conventional submodule is:

$$C_M = \dfrac{P_s}{3kM\omega\varepsilon U_c^2}\left[1 - \left(\dfrac{k\cos\varphi}{2}\right)^2\right]^{\frac{3}{2}}, \quad (6)$$

wherein $U_c$ is a voltage of the submodule, $\varepsilon$ is a fluctuation rate of capacitor voltage, $P_s$ is a rated power, and M is the number of submodules of each bridge-arm in a conventional modular multilevel topology.

In practical engineering applications, the formula for calculating capacitance is shown in Formula (7):

$$C_M = \dfrac{P_s}{3kM\omega\varepsilon U_c^2}. \quad (7)$$

In order to facilitate calculation and analysis of the effects, a frequency-tripled power in the bridge-arm is ignored, and a power factor is assumed to be 1. After the APF circuit is added, the energy of the bridge-arm is stored in the submodules of the bridge-arm. In this case, the capacitance of a submodule is:

$$C_N = \dfrac{\tfrac{1}{4}U_d I_{am} - \tfrac{1}{3}U_{am}I_d}{M\omega\varepsilon U_c^2}. \quad (8)$$

From Formulas (7) and (8) and the experience of capacitance value in practical applications, it can be obtained that the relationship between the capacitance of the submodule of the topology used in the present disclosure and the capacitance of the conventional MMC submodule is:

$$\rho = \dfrac{C_N}{C_M} = \dfrac{kM\left(\tfrac{3}{4}U_d I_{am} - U_{am}I_d\right)}{MP_s} \approx 1 - \dfrac{k^2}{2}. \quad (9)$$

It can be seen from Formula (9) that, $\rho<1$, and the lager k is, the smaller $\rho$ is, i.e., the smaller the capacitance of the submodule of the topology used in the present disclosure is; the minimum value can approximately reach ½ of the capacitance of the conventional MMC submodule.

Since the two intermediate submodules are connected in parallel to the APF circuit, part of powers of signals at odd multiple of frequency with opposite signs in the two submodules cancels each other out by means of the APF circuit, and thus the submodules of the APF circuit bear less energy than other submodules.

In order to verify the feasibility and superiority of the topology proposed in the present disclosure, the applicant performed the following simulation experiments.

Figure 3:
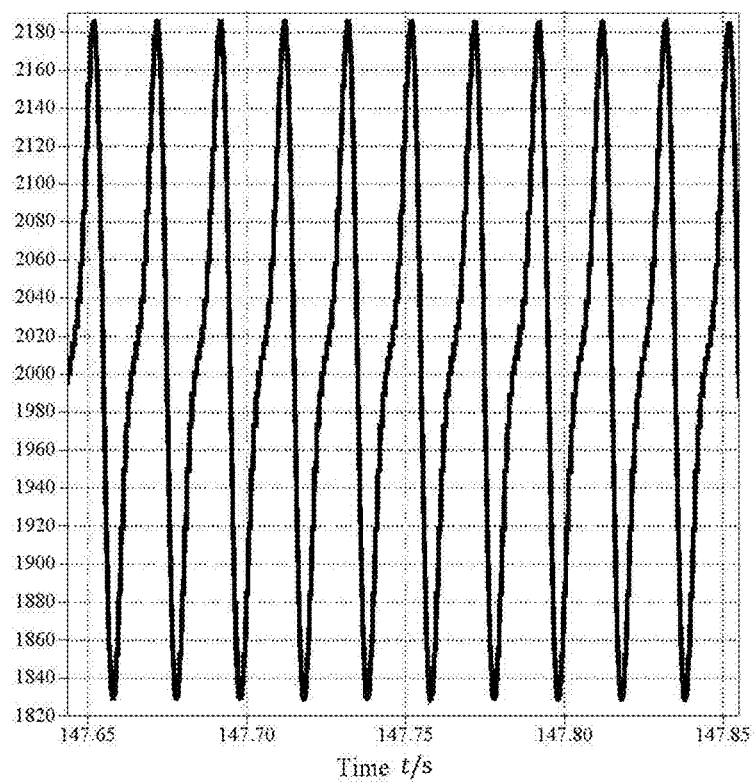
FIG. 3 shows voltages of a conventional MMC submodule.
Figure 4:
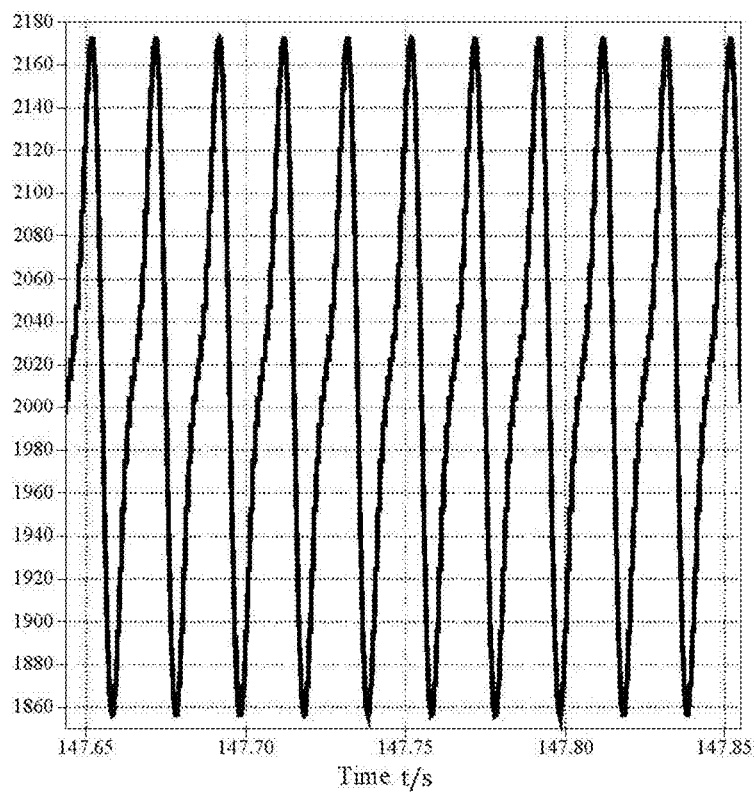
FIG. 4 shows voltages of a submodule of an APF-MMC bridge-arm.
Figure 5:
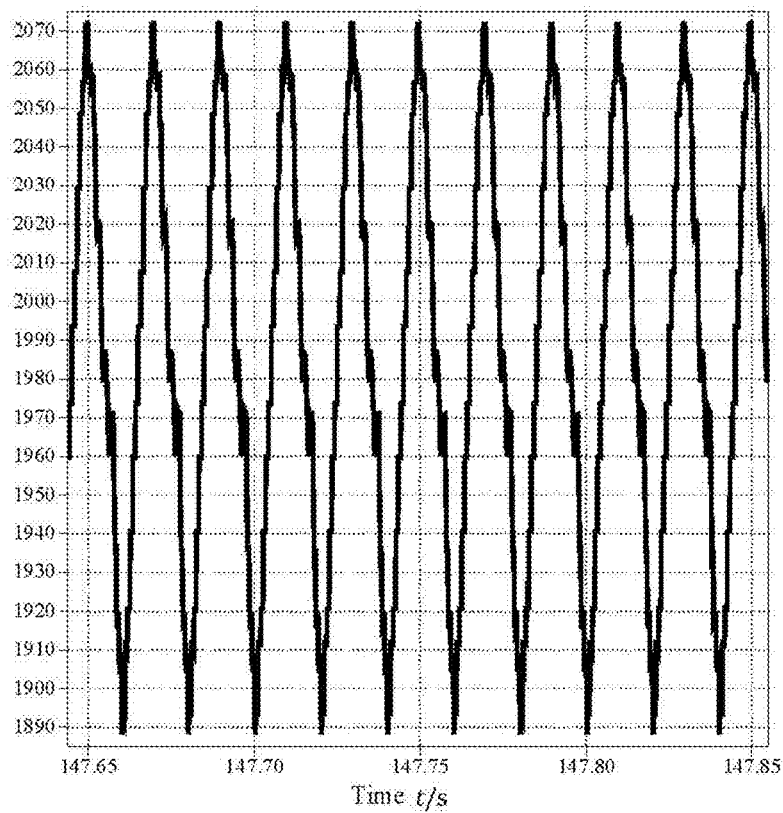
FIG. 5 shows voltages of an intermediate submodule of the APF-MMC bridge-arm.
Figure 6:
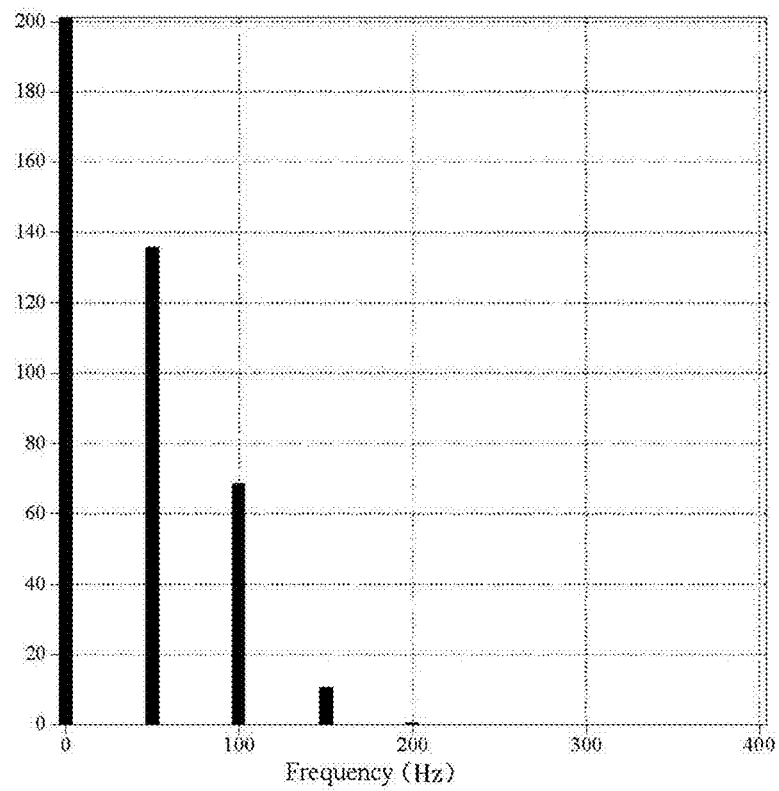
FIG. 6 shows FFT values of voltage of the conventional MMC submodule.
Figure 7:
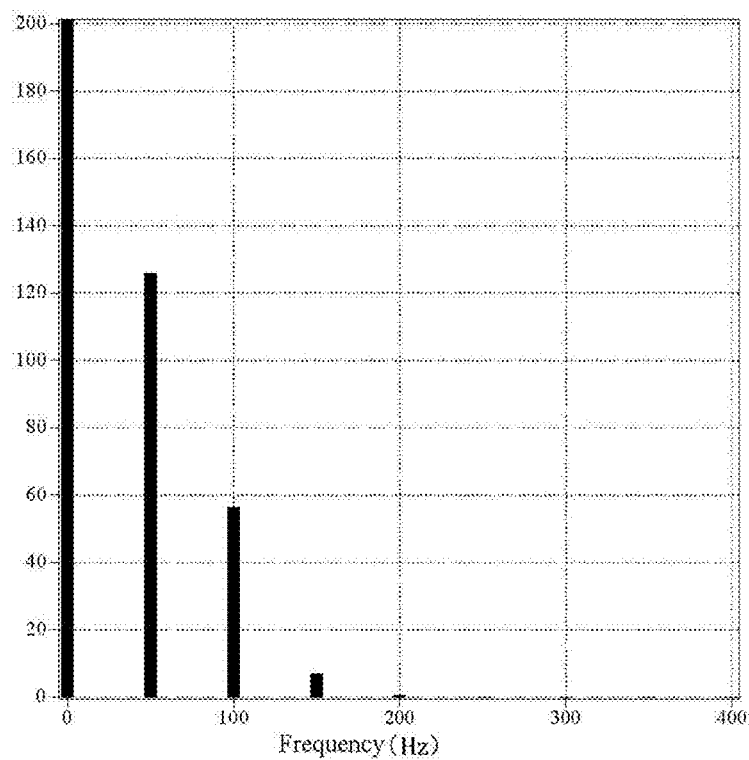
FIG. 7 shows FFT values of voltage of the submodule of the APF-MMC bridge-arm.
Figure 8:
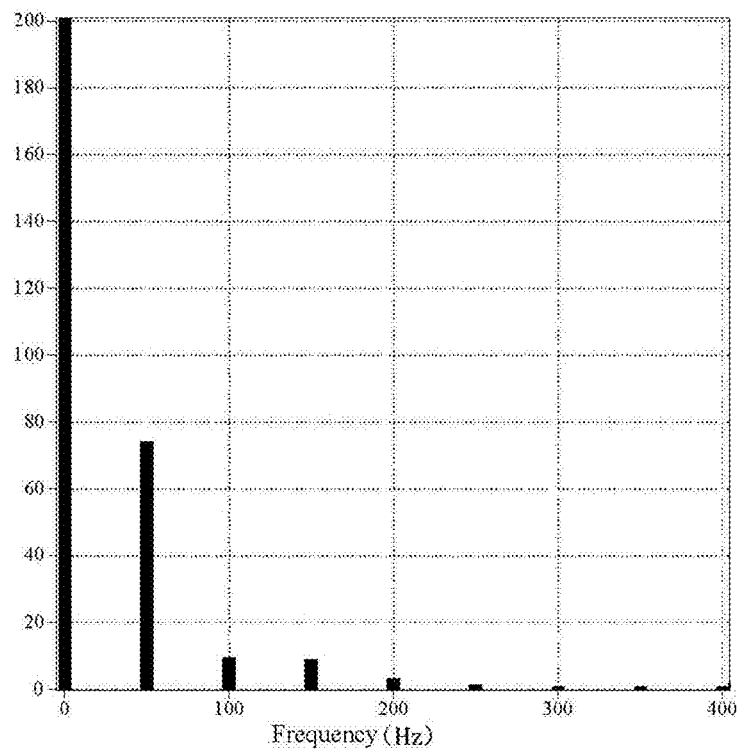
FIG. 8 shows FFT values of voltage of the intermediate submodule of the APF-MMC bridge-arm.

The experimental parameters are as follows. In a topology (as shown in FIG. 1 and FIG. 2), each bridge-arm is composed of four submodules. The capacitance of each module is 1.36 mF, the DC-side voltage is 8000 V, and the effective value of the AC-side output voltage is 2200 V. At this time, $$k = \dfrac{2200\sqrt{2}}{8000/2} \approx 0.7778,$$

and ρ=0.757. Simulation results are shown in FIG. 3 to FIG. 5, and FFT analysis results of simulation waveforms are shown in FIG. 6 to FIG. 8. FIG. 3 is a diagram of capacitor voltage waveforms of a submodule (the capacitance of the submodule is 1.36 mF) of a conventional topology, and FIG. 6 is a schematic diagram of FFT analysis of the capacitor voltage waveforms of the submodule (the capacitance of the submodule is 1.36 mF) of the conventional topology. FIG. 4 is a diagram of capacitor voltage waveforms of a submodule (the capacitance of the submodule is 1.36 mF) of a topology of the present disclosure, and FIG. 7 is a schematic diagram of FFT analysis of the capacitor voltage waveforms of the submodule (the capacitance of the submodule is 1.36 mF) of the topology of the present disclosure. FIG. 5 is a diagram of voltage waveforms of an intermediate submodule (the capacitance of the submodule is 1.36 mF) of a bridge-arm of the topology of the present disclosure, and FIG. 8 is a schematic diagram of FFT analysis of the voltage waveforms of the intermediate submodule (the capacitance of the submodule is 1.36 mF) of the bridge-arm of the topology of the present disclosure.

It can be seen from the simulation comparison that the topology of the present disclosure is a power decoupling-based modular multilevel converter, which has a reasonable design, low cost and high power density and is completely equivalent to the existing modular multilevel topology.

The above are only specific embodiments of the present disclosure, but the structural features of the present disclosure are not limited thereto. Any changes or modifications made, in the field of the present disclosure, by those skilled in the art are covered by the scope of the present disclosure.

The invention claimed is:

1. An active power filter-based modular multilevel converter, comprising six bridge-arms of three phases, each phase including an upper bridge-arm and a lower bridge-arm, each bridge-arm including a bridge-arm inductor and at least one submodule of a same structure which are connected in series, each submodule being composed of two switch power devices and a capacitor, wherein, an active power filter circuit is provided between the upper and lower bridge-arms of each phase, said circuit including two switch power devices, two submodules, a capacitor, and an inductor, wherein the upper and lower bridge-arms are connected in series by means of two submodules, which are called intermediate submodules; the two switch power devices of the active power filter circuit are connected in series and then connected in parallel to ends of the intermediate submodules which are connected in series; and the capacitor and the inductor are connected in series and then connected in parallel to two ends of the switch power device connected to the lower bridge-arm.

2. The modular multilevel converter according to claim 1, wherein the switch power devices in the submodule have backward diodes.

3. The modular multilevel converter according to claim 1, wherein the bridge-arm inductor is located at an end of each phase, i.e., one end of the bridge-arm inductor is directly connected to a bus bar, and the other end of the bridge-arm inductor is connected to a submodule; or the bridge-arm inductor is located in the bridge-arm other than between the intermediate submodules.

4. The modular multilevel converter according to claim 1, wherein each submodule has three external terminals, an upper terminal of which is extracted from a collector electrode of a first power switch device, an intermediate terminal of which is extracted from a joint between an emitter of the first power switch device and a collector electrode of the second power switch device, and a lower terminal of which is extracted from an emitter of the second power switch device; and the capacitor in the submodule is connected in parallel between the upper terminal and the lower terminal.

5. The modular multilevel converter according to claim 2, wherein each submodule has three external terminals, an upper terminal of which is extracted from a collector electrode of a first power switch device, an intermediate terminal of which is extracted from a joint between an emitter of the first power switch device and a collector electrode of the second power switch device, and a lower terminal of which is extracted from an emitter of the second power switch device; and the capacitor in the submodule is connected in parallel between the upper terminal and the lower terminal.

6. The modular multilevel converter according to claim 3, wherein each submodule has three external terminals, an upper terminal of which is extracted from a collector electrode of a first power switch device, an intermediate terminal of which is extracted from a joint between an emitter of the first power switch device and a collector electrode of the second power switch device, and a lower terminal of which is extracted from an emitter of the second power switch device; and the capacitor in the submodule is connected in parallel between the upper terminal and the lower terminal.

* * * * *